United States Patent [19]

Miaoulis

[11] Patent Number: 5,398,747

[45] Date of Patent: Mar. 21, 1995

[54] AUTOMOTIVE VEHICLE AUXILIARY COMPONENT PREHEATING METHOD AND SYSTEM

[75] Inventor: Ioannis N. Miaoulis, Stow, Mass.

[73] Assignee: Tufts University, Medford, Mass.

[21] Appl. No.: 952,244

[22] Filed: Sep. 28, 1992

[51] Int. Cl.⁶ .............................................. F25B 17/08
[52] U.S. Cl. ................................. 165/41; 165/104.12; 62/480; 60/300
[58] Field of Search ............... 165/41, 104.12; 62/480; 60/300

[56] References Cited

U.S. PATENT DOCUMENTS 4,924,676  5/1990  Maier-Laxhuber ............... 62/480
4,991,644  2/1991  Miaoulis et al. ................ 165/104.12

FOREIGN PATENT DOCUMENTS 275820  11/1987  Japan ............................. 62/480

*Primary Examiner*—Albert W. Davis, Jr.
*Attorney, Agent, or Firm*—Kriegsman & Kriegsman

[57] ABSTRACT

A method and system for preheating one or more auxiliary components of an automotive vehicle having an internal combustion engine or other means for producing hot exhaust gases. The method and system use waste thermal energy extracted from engine exhaust gases produced when the engine is running. This thermal energy is stored in a special thermal storage material in the form of chemical potential by a direct dehydration/hydration process. The thermal energy is released during a cold start and used to warm ambient air, which may then be conveyed to one or more desired auxiliary components, such as the catalytic converter, the passenger cabin or the like.

7 Claims, 8 Drawing Sheets

AUTOMOTIVE VEHICLE AUXILIARY COMPONENT PREHEATING METHOD AND SYSTEM

BACKGROUND OF THE INVENTION

The present invention relates to a method and system for preheating one or more auxiliary components of an automotive vehicle, the automotive vehicle including means, such as an internal combustion engine, for producing hot exhaust gases.

Certain auxiliary components of an automobile are adversely affected by cold temperatures. For example, catalytic converters, which are widely used to remove pollutants and other noxious compounds from the exhaust produced by an internal combustion engine, typically do not perform as desired in the first few minutes after a car has been started in cold weather. This is because catalytic converters typically require internal temperatures from about 200 to 400 degrees Celsius. Consequently, about 90% of the undesired emissions produced by an automobile are generated within the first few minutes after a cold start as the catalytic converter warms from the cold ambient temperature to its regular operating temperature.

One approach that is currently under investigation as a way to quickly heat a catalytic converter to its regular operating temperature after a cold start involves using an electically-powered heating coil that is placed in contact with the catalytic converter. The electricity required to operate the heating coil may be supplied by the automotive battery or by an independent battery. One problem encountered with this approach, however, is that the battery itself is often adversely affected by cold temperatures and is unable to perform its intended function.

In addition to affecting the performance of catalytic converters, cold temperatures also typically adversely affect the speed with which automobile cabin heating systems begin to work effectively. This is because cold ambient air drawn over the heating elements of the system acts as a heat sink, keeping the heating elements from quickly reaching theft regular operating temperatures. Consequently, it may take a few minutes after a cold start for hot air to be blown into the cabin of an automobile.

One approach that is currently under investigation as a way to quickly heat the cabin of an automobile in cold temperatures involves using a thermal storage system wherein the latent heat of melted barium hydroxide salts is kept in an insulated container until fits necessary for use. One problem encountered with this approach, however, is that the insulated containers used to store the melted barium hydroxide salts often experience heat loss, thereby providing only a limited storage period.

In U.S. Pat. No. 4,991,644 to Miaoulis et al., which is incorporated hereinto by reference, a system for preheating a diesel engine to facilitate its starting in cold temperatures is disclosed. The system uses waste thermal energy from the engine exhaust gases produced when the engine is running as a source of thermal energy. This thermal energy is stored in a special thermal storage material in the form of chemical potential by a direct dehydration/hydration process. The thermal energy is released during a cold start and used to warm the engine intake air before it reaches the engine cylinders. This thermal energy carried into the cylinders by the intake air helps overcome the heat-sinking effects of the cold engine when the engine is cranked.

SUMMARY OF THE INVENTION

It is an object of the present invention to provide a new and novel system for preheating one or more auxiliary components of an automotive vehicle, the automotive vehicle including means, such as an internal combustion engine, for producing hot exhaust gases.

It is another object of the present invention to provide a preheating system of the type described above which is completely self-contained and does not require an external energy source.

It is still another object of the present invention to provide a preheating system of the type described above that can be maintained in a ready-to-start condition for an indefinite period of time and does not require insulation for containing thermal energy.

It is still yet another object of the present invention to provide a preheating system of the type described above which does not release additional noxious fumes into the environment when it is in operation.

It is a further object of the present invention to provide a new and novel preheating method for achieving one or more of the above objects.

Additional objects, as well as features and advantages, of the present invention will be set forth in part in the description which follows, and in part will be obvious from the description or may be learned by practice of the invention. The objects, features, and advantages of the invention may be realized and attained by means of the instrumentalities and combinations particularly pointed out in the appended claims.

To achieve the above objects and in accordance with the teachings of the present invention, a method and system are hereinafter described for preheating one or more auxiliary components of an automotive vehicle, the automotive vehicle including means, such as an internal combustion engine, for producing hot exhaust gases, the method and system relying on waste thermal energy present in the hot exhaust gases. This thermal energy is stored in a special thermal storage material in the form of chemical potential by a direct dehydration/hydration process. The thermal energy is released during a cold start and is used to warm one or more desired auxiliary components of the automotive vehicle.

The storing of thermal energy in the form of a chemical potential results in many beneficial side effects. The system is completely self-contained and does not require an external energy source. Moreover, the energy can be stored in the thermal storage material at ambient temperature. Therefore, the preheater system can be maintained in a ready-to-start condition for an indefinite period of time. For the same reason, no insulation is required to contain the thermal energy so that the preheater system can be quite compact. Further, as will be seen, the preheater is a completely closed system. Therefore, the operation of the system releases no fumes or noxious gases into the atmosphere that could present a hazard to personnel workding in the vicinity thereof. Finally, the system can be made almost entirely of standard piping and sheet metal parts. Therefore, it is relatively inexpensive to make and to incorporate into present day vehicles and other heavy equipment.

For purposes of the present specification and claims, an "auxiliary component of an automotive vehicle" is defined as being any portion, component, or system of the automotive vehicle which is adapted to receive a heated fluid or which may be warmed by a heated fluid. Examples of "auxiliary components" include, but are not limited to, a catalytic converter, a passenger cabin, and a battery. For purposes of the present specification and claims, an "auxiliary component of an automotive vehicle" is further defined as not including an engine used to power the automotive vehicle.

The accompanying drawings, which are hereby incorporated into and constitute a part of this specification, illustrate the preferred embodiments of the invention and, together with the description, serve to explain the principles of the invention. In these drawings, wherein like reference numerals represent like parts:

Figure 10:
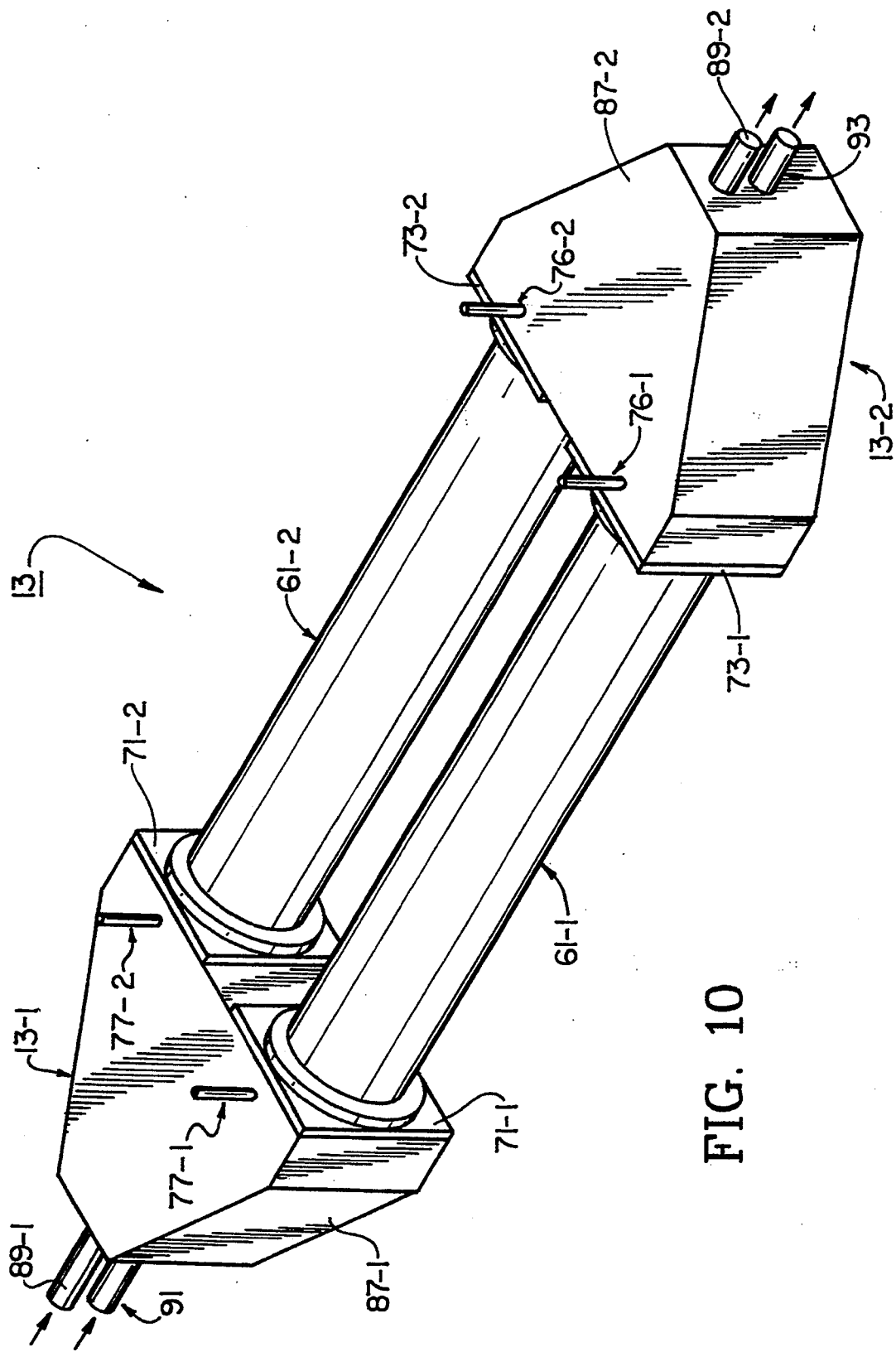
FIG. 10 is a perspective view of the heat exchanger shown in FIG. 9.
Figure 11:
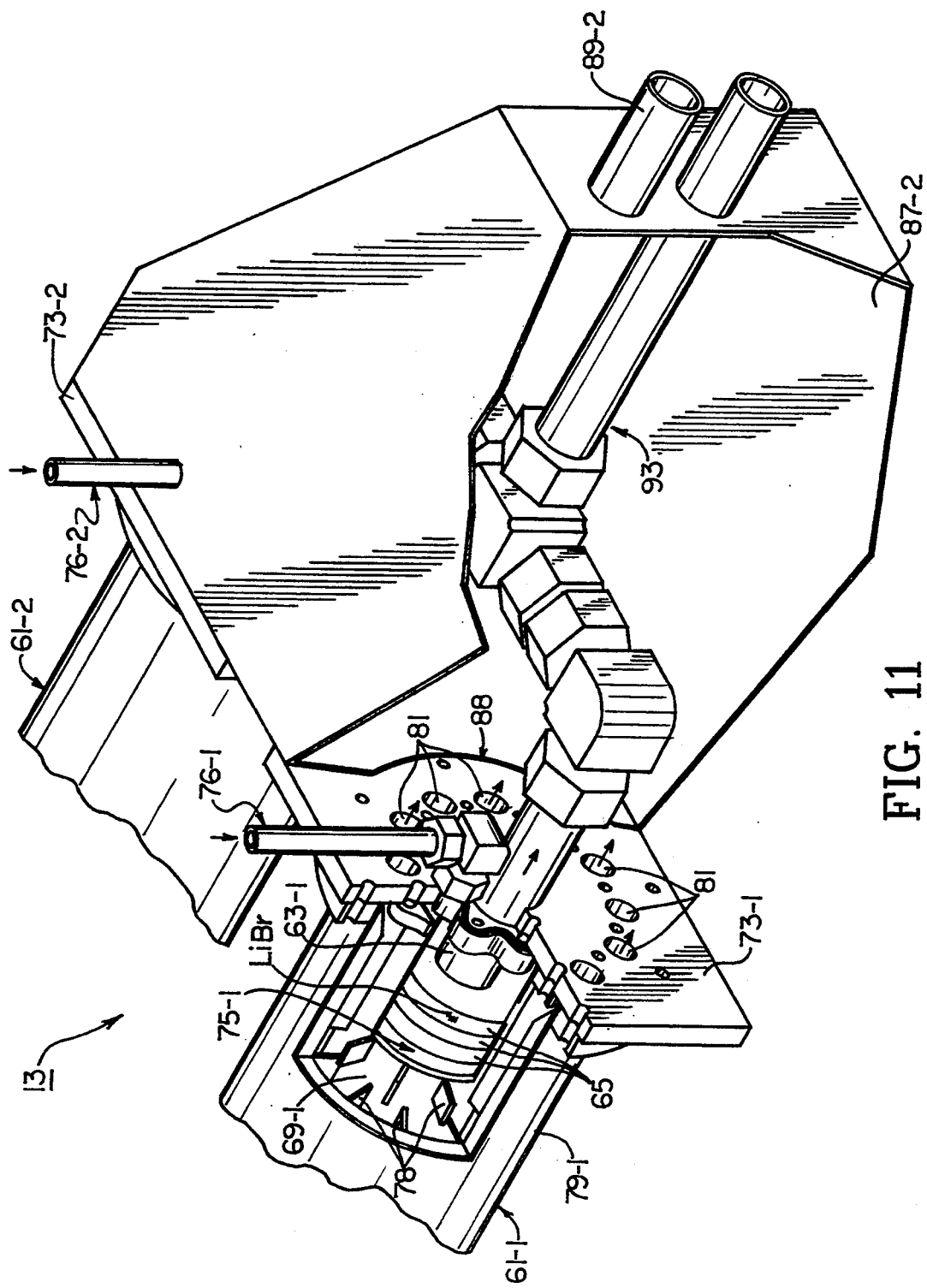
Figure 12:
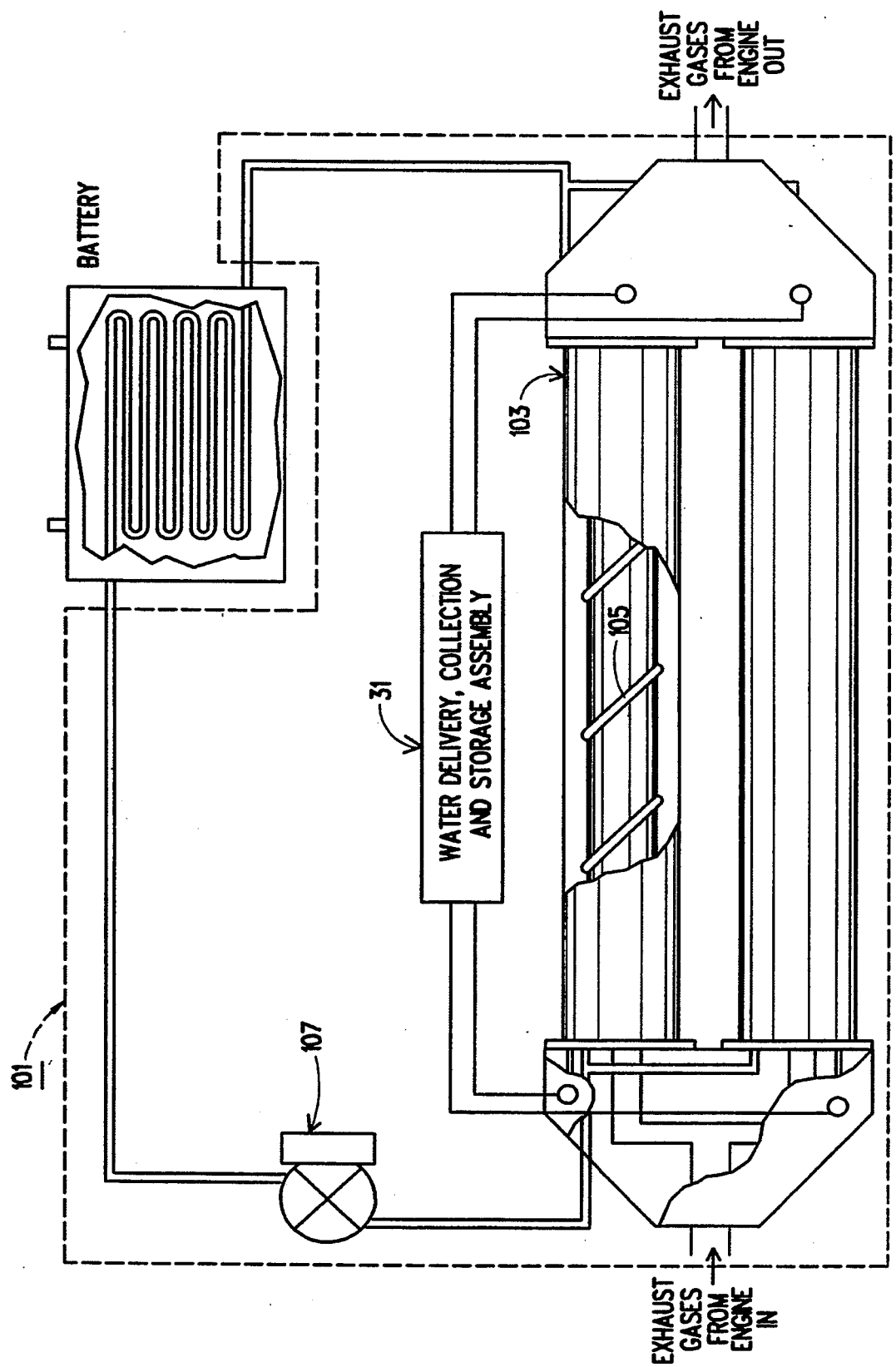

FIG. 11 is a fragmentary perspective view, broken away in part, of the heat exchanger shown in FIG. 10; and FIG. 12 is a schematic diagram of one embodiment of a system for pre-heating the battery of an automotive vehicle having an internal combustion engine or the like capable of producing hot exhaust gases, the pre-heating system being constructed according to the teachings of the present invention.

Since the present invention relies on a dehydration/hydration cycle to store thermal energy in the form of a chemical potential, a brief description of that phenomenon is in order. When hydrating certain materials, i.e. by adding an appropriate hydrating solvent thereto, considerable heat is released. In some cases, water molecules are adsorbed by the material and the heat of adsorption is released. In other cases, the water dissolves the material which, in turn, evolves heat in the form of heat of solution. The direct dehydration/hydration processes are reversible in that they form a cycle in which energy is alternately stored and released.

Figure 1:
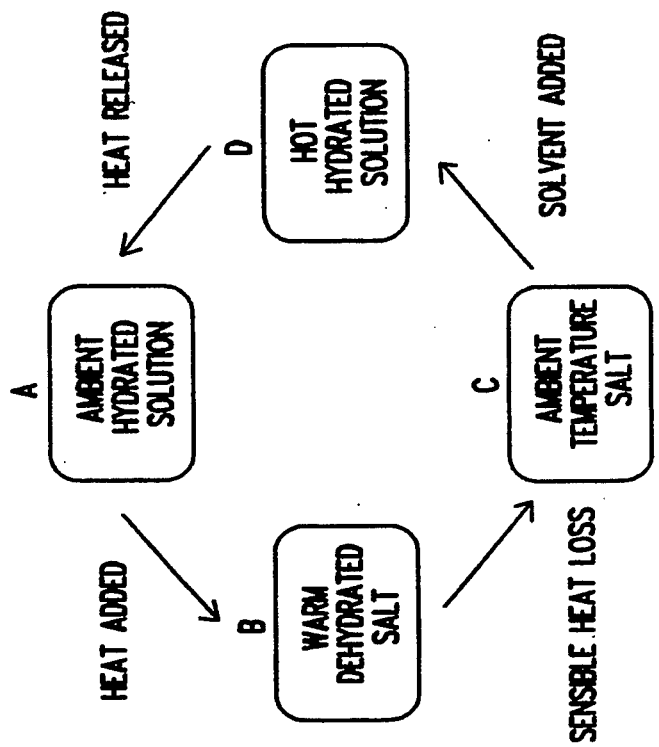
FIG. 1 is a schematic diagram illustrating how a dehydration/hydration cycle may be used to store and release thermal energy in the form of a chemical potential.

The full cycle of steps for thermal energy storage in this fashion is illustrated in FIG. 1. As shown there, the hydrated thermal storage material is present at stage A in the cycle. The thermal energy to be stored is then applied to the hydrated thermal storage material to heat the material and to drive off the water therein. This thermal energy is used to break the bonds between the molecules of the storage material and the solvent. At stage B, after the thermal storage material has been dehydrated and is still at an elevated temperature, it is sealed off from all water or moisture. The material then eventually cools to ambient temperature giving up its sensible heat to the environment and may be stored indefinitely at stage C.

When it is desired to recover the stored thermal energy from the thermal storage material at stage C, the hydrating solvent is added thereto. As soon as the solvent contacts the thermal storage material, the bonds between the solvent molecules and the molecules of the storage material are recreated as in stage D. The formation of these bonds results in the conversion of chemical potential energy to thermal energy. Heat is released from the solution, and the rehydrated storage material is at stage A again. The storage material may be dehydrated and rehydrated repeatedly, each time storing and then releasing thermal energy.

One class of materials which will undergo a dehydration/hydration reaction is the class of adsorbents which includes zeolites, silica gels, charcoals, and activated aluminas. Each of these materials has a large internal surface area and the ability to trap and hold water by capillary action and physical adsorption. Physical adsorption or physiosorption is reversible adsorption by weak interaction only; no covalent bonds occur between the adsorbent, the thermal storage material in this case, and the adsorbate, i.e., water. When water contacts any dehydrated adsorbant material, a bond forms due to a discontinuity in intramolecular or interatomic forces. The amount of heat evolved in the adsorption reaction depends upon the adsorbant and the adsorbate and the strength of the bond formed. The weak bond between the adsorbant and the adsorbate can be broken only by the input of thermal energy.

A second class of materials that will undergo a reversible hydration process is the class of salts. When a salt such as lithium chloride (LiCl) or lithium bromide (LiBr) is dissolved in water, it dissociates into its component ions. The polar water molecules are attracted to the salt's ions and form weak bonds with them. As a result of the formation of these bonds, heat is evolved as heat of solution. The strength of these bonds and thus the amount of heat evolved by their formation depends upon the salt used. When the salt in solution is heated to a sufficiently high temperature, the water can be boiled off of the solution, leaving the dehydrated salt.

The aforementioned zeolites, salts, aluminas, charcoals, and silica gels all have the ability to form a weak bond with water molecules, thereby releasing heat. In each case, the weak bond formed does not involve any rearrangement of atoms between molecules. The water can be extracted from each of these materials simply by heating them. Both of these classes of materials can undergo repeated dehydration/hydration cycles of the type shown In FIG. 1 and, therefore, are potential candidates for the thermal storage material in a preheater system that relies on reversible hydration.

We have found, however, that of all of these materials, only a very few best satisfy the following requirements for operation in the manner to be described below:

reversibility—material should be able to be recycled repeatedly without changing its structure and experience a consistent temperature rise upon successive rehydration;

time/temperature profile for dehydration—material should be dehydrated completely at temperatures of 200 to 350 degrees Celsius by the heat evolved by the engine exhaust gases in a reasonably short time, e.g., under 2 hours;

thermal energy storage density—material should evolve sufficient thermal energy when rehydrated to raise engine intake temperature at least 30 to 45 degrees Celsius; and water penetration—to evolve thermal energy quickly during rehydration, there should be quick penetration of water into the material.

The thermal storage material which best satisfies the above requirements is lithium bromide (LiBr), although the following zeolites may be useful to a lesser extent in certain specific applications:

PQ-3A—molecular sieve, type 3A, potassium cation powder from PQ Corp.;

PQ-13X—molecular sieve, type 13X cation 8–12 mesh bead from PQ Corp.;

M-564—molecular sieve, type 3A, potassium cation, 8–12 mesh bead from Davidson, brand material distributed by Fisher Scientific Co., Fairlawn, N.J.; and ZLD-400—molecular sieve, type X, powder, from Union Carbide Corporation, Danbury, Conn.

Although hydration of LiBr using pure water can be done under above water freezing point heat recovery conditions, it is not usually feasible at lower temperatures. This is unfortunate since, as discussed earlier, it is frequently at such lower temperatures that it is most desirable to release stored thermal energy in LiBr so that the auxiliary components of an automobile may be preheated. One solution to this problem is to use mixtures of ethanol and water, instead of pure water, as the hydrating solvent. Ethanol/water mixtures are desirable because they possess the following properties: hydration reversibility, low freezing point, and non-toxicity.

Figure 2:
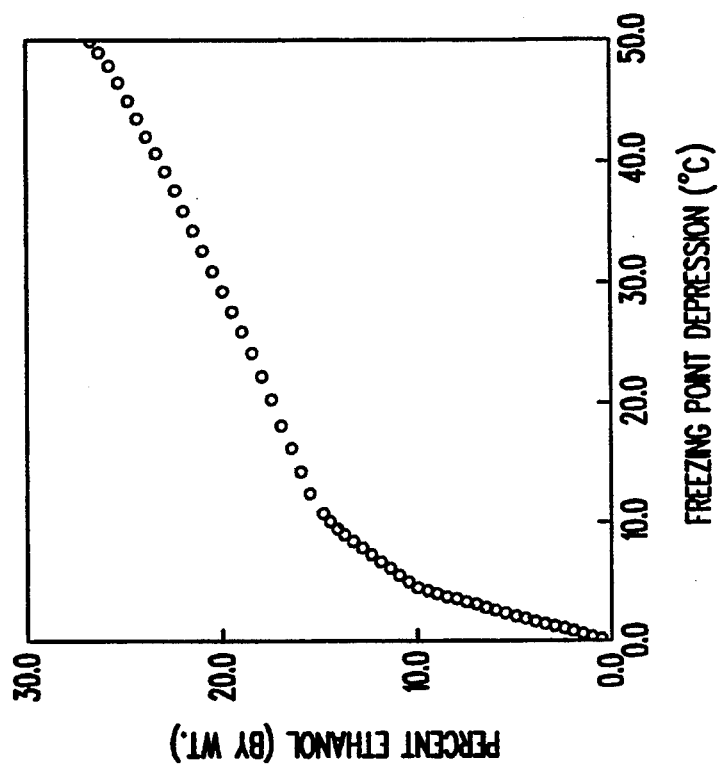
FIG. 2 is a graphic representation of the freezing point depressions of various ethanol/water mixtures.

Ethanol can expand the temperature range of heat recovery using reversible hydration of LiBr. The freezing point depressions of various ethanol/water mixtures are shown in FIG. 2. As can readily be appreciated, the ratio of water to ethanol can be varied depending on the surrounding temperature during heat recovery.

Figure 3:
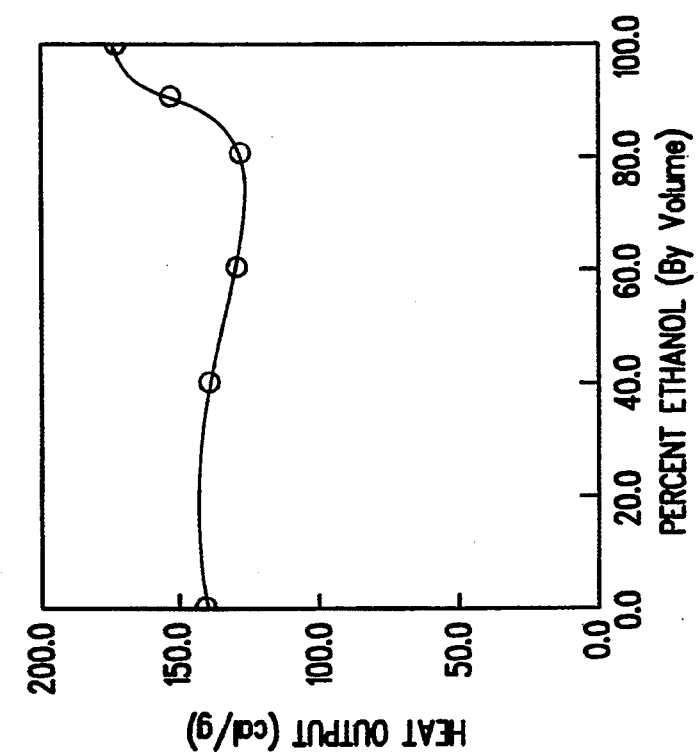
FIG. 3 is a graphic representation of the heat of solution of LiBr in various ethanol/water mixtures.

The heat of solution of LiBr in various solutions of ethanol and water is shown in FIG. 3. As can be seen, pure ethanol results in a higher heat recovery than pure water. However, mixtures of less than 80% ethanol result in similar heat recovery as pure water.

Figure 4:
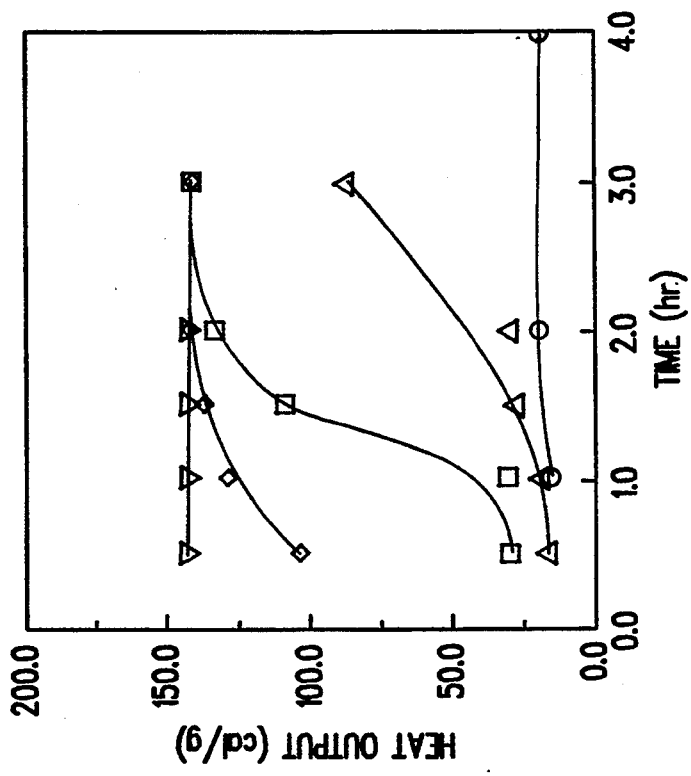
FIG. 4 is a graphic representation of the heat of recovery of a 0% ethanol LiBr solution for varying dehydration temperatures.
Figure 6:
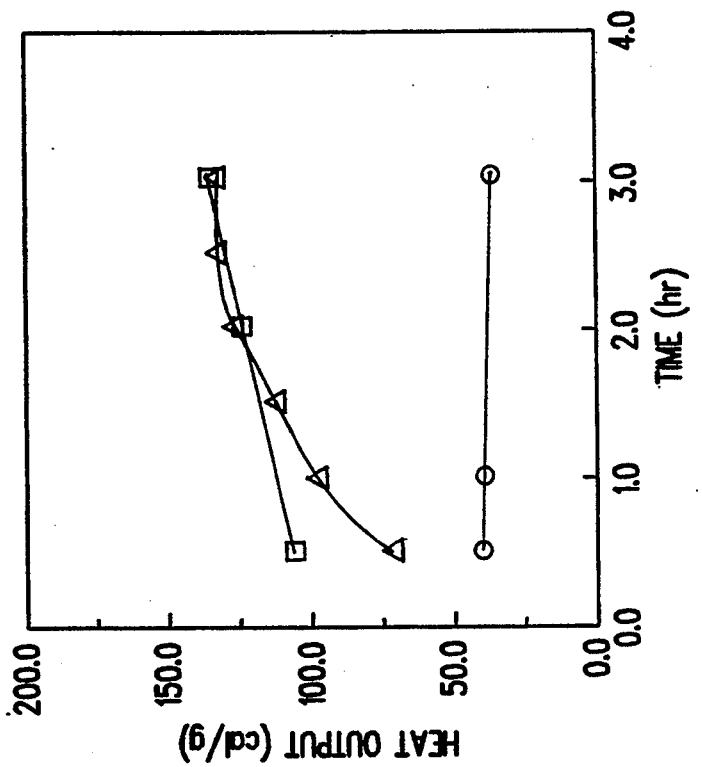
FIG. 6 is a graphic representation of the heat of recovery of a 90% ethanol LiBr solution for varying dehydration temperatures.
Figure 5:
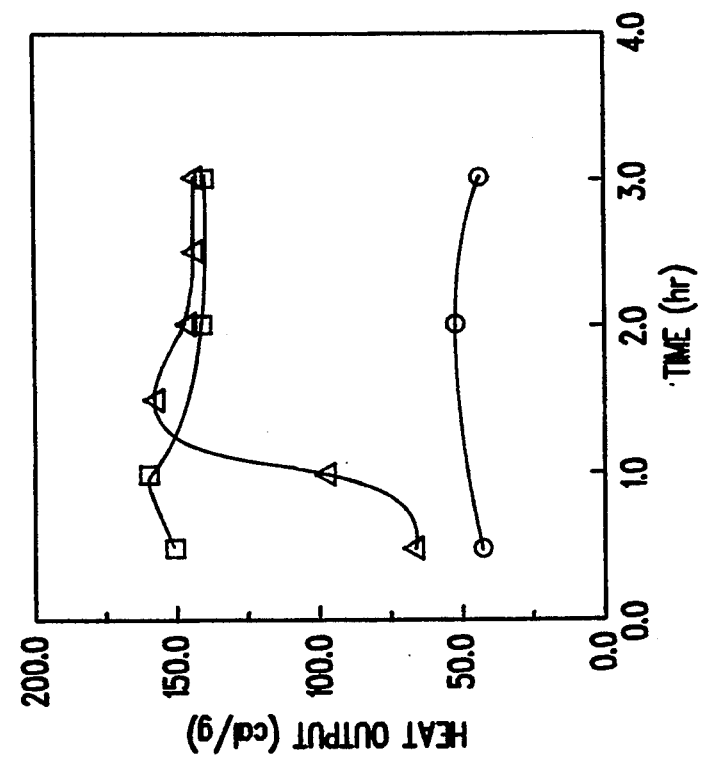
FIG. 5 is a graphic representation of the heat of recovery of a 50% ethanol LiBr solution for varying dehydration temperatures.
Figure 7:
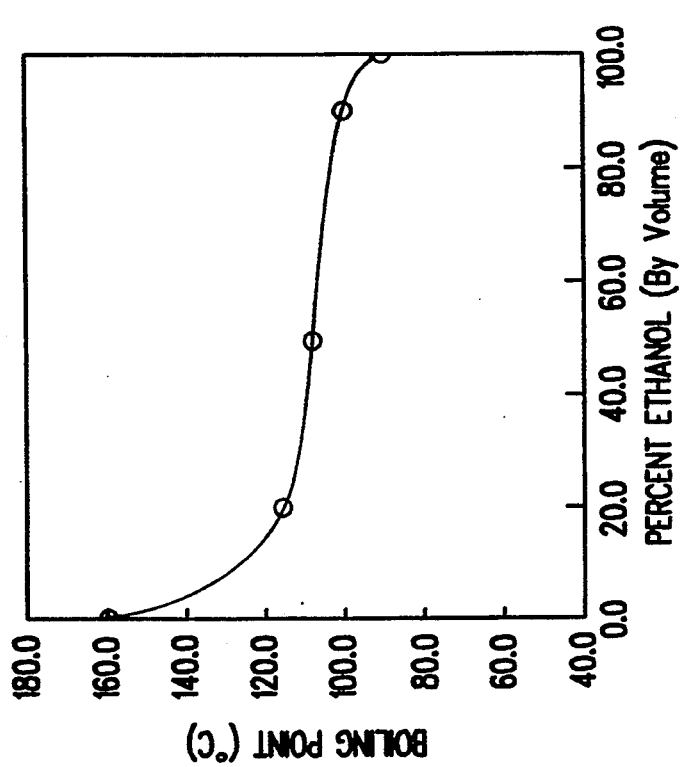
FIG. 7 is a graphic representation of the boiling points of LiBr solutions as a function of ethanol concentration.

The necessary dehydration times for various LiBr solutions and temperatures are shown in FIGS. 4 through 6, FIG. 4 presenting heat recovery versus heat of hydration for pure water, FIG. 5 presenting heat recovery for a 50% by volume mixture of ethanol and water, and FIG. 6 presenting heat recovery for a 90% by volume mixture of ethanol and water. In all cases, it is evident that the solution must be heated above its boiling point in order to achieve maximum energy storage. The boiling points of LiBr in various solutions of ethanol and water are shown in FIG. 7.

Figure 8:
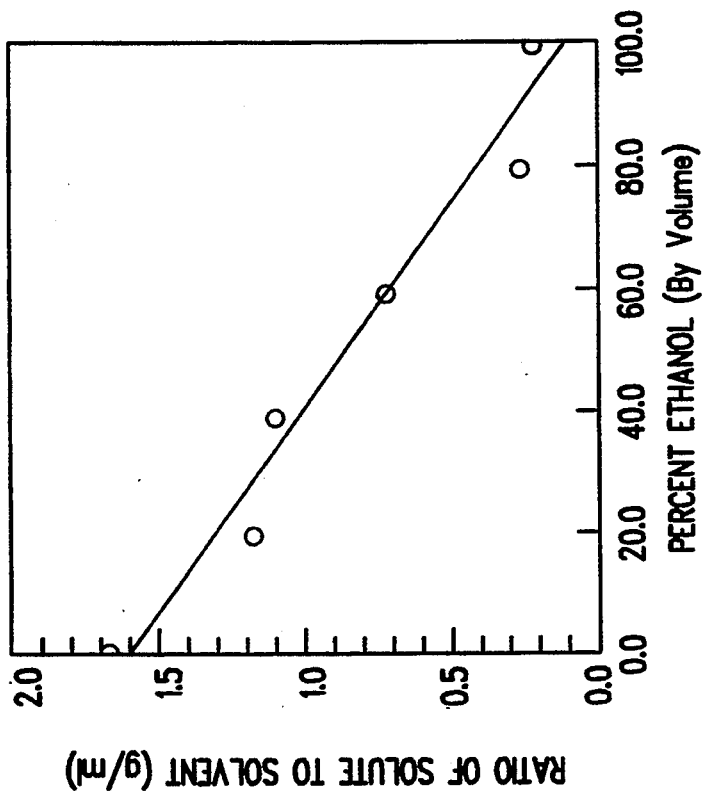
FIG. 8 is a graphic representation of the solubility of LiBr as a function of ethanol concentration.

FIG. 8 shows the solubility of LiBr for different ethanol concentrations. It is evident that the solubility of LiBr is inversely proportional to the ethanol concentration in the solvent. These results can be used to determine optimum LiBr solution ratios for applications of various heat recovery temperature environments.

Figure 9:
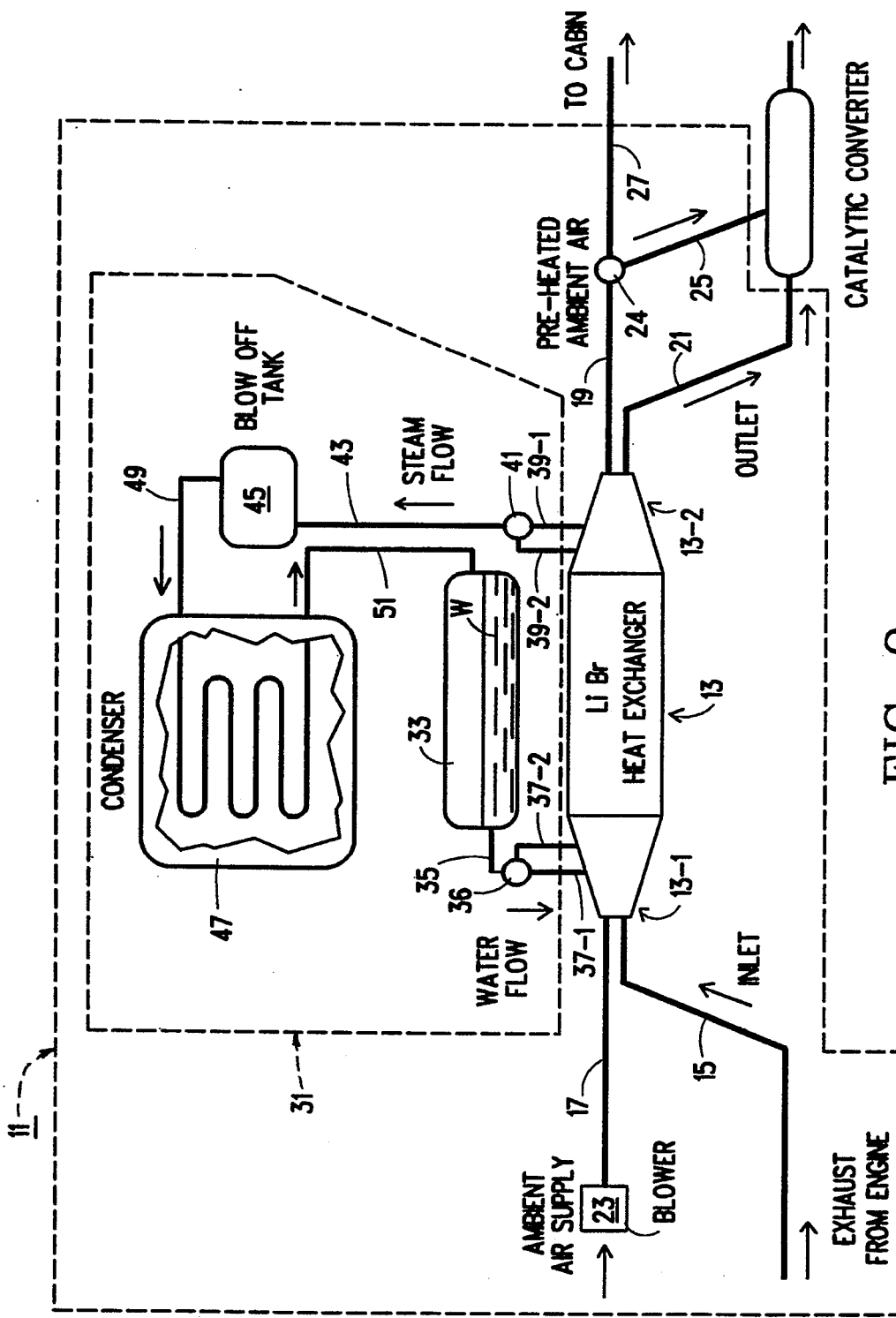
FIG. 9 is a schematic diagram of one embodiment of a system for preheating the catalytic converter and the passenger cabin of an automotive vehicle having an internal combustion engine or the like capable of producing hot exhaust gases, the pre-heating system being constructed according to the teachings of the present invention.

Referring now to FIG. 9, there is schematically shown a system for pro-heating the catalytic converter and the passenger cabin of an automotive vehicle or other similar piece of equipment having means, such as an internal combustion engine, for producing hot exhaust gases, the system being constructed according to the teachings of the present invention and being represented generally by reference numeral 11.

System 11 includes a LiBr heat exchanger 13. Heat exchanger 13 is connected at its inlet end 13-1 to the outlet ends of pipes 15 and 17 and at its outlet end 13-2 to the inlet ends of pipes 19 and 21. The inlet end of pipe 15 is connected to the exhaust manifold of the vehicle's engine so that hot exhaust gases from the engine may be conveyed to heat exchanger 13. The inlet end of pipe 17 is connected to a blower 23 which is used to draw ambient air into heat exchanger 13. As will be discussed below in greater detail, heat exchanger 13 is used to store some of the thermal energy present in the hot exhaust gases and to transfer it at a later time, i.e., after a cold start, to the ambient air.

Pipe 19, which is used to convey heated ambient air from heat exchanger 13, is connected at its outlet end through a valve 24 to the inlet ends of a pair of pipes 25 and 27. The outlet end of pipe 25 is connected to an inlet port of a catalytic converter, and the outlet end of pipe 27 leads into the passenger cabin. Valve 24, which may be either manually operable or electrically operable using a solenoid actuated switch, has a pair of settings so that the heated second stage air in pipe 19 may be conducted to both the catalytic converter and the passenger cabin or, alternatively, to the catalytic converter only (as would typically be desired in warm weather).

System 11 also includes a water delivery, collection and storage assembly 31. Assembly 31 includes a water tank 33 wherein a quantity of about 4 pounds of water or a water/ethanol mixture (hereinafter referred to simply as "water") is stored. Water contained In water tank 33 is conveyed therefrom by a pipe 35, the inlet end of which is connected to an outlet port on tank 33. The outlet end of pipe 35 is connected by way of an on/off valve 36 to the inlet ends of a pair of pipes 37-1 and 37-2, the outlet ends of which are connected to heat exchanger 13. Although valve 36 could be a manually operable valve, it is preferably an electrically operable solenoid valve controllable automatically or by the operator of the vehicle in which the system is installed.

Assembly 31 also includes a pair of pipes 39-1 and 39-2, the inlet ends of which are connected to heat exchanger 13 for the purpose of conveying steam therefrom during dehydration of the LiBr solution. The outlet ends of pipes 39-1 and 39-2 are connected by way of a second solenoid operated on/off valve 41 to the inlet end of a pipe 43. The outlet end of pipe 43 is connected to a blow-off tank 45 which, in turn, is connected to a condenser 47 through a pipe 49. Finally, a pipe 51 connects the outlet end of condenser 47 to the inlet port of water tank 33.

Referring now to FIGS. 10 and 11, heat exchanger 13 is shown in greater detail. Heat exchanger 13 includes a pair of heat exchanger cores 61-1 and 61-2. Cores 61-1 and 61-2 are identical in size, shape and construction. Accordingly, the following description of core 61-1 applies equally to core 61-2.

As seen best in FIG. 11, core 61-1 includes an inner pipe 63-1 made of corrosion-resistant, thermally-conductive material, such as 5052 and 3003 aluminum. A series of radially extending fins 65 are mounted, e.g., by welding, along the length of pipe 63-1 in such a way that pipe 63-1 and fins 65 are in an intimate heat exchange relationship.

Core 61-1 also includes an elongated tube 69-1 which extends axially along most of the length of pipe 63-1. Tube 69-1 is also made of a corrosion-resistant, thermally conductive material, such as 5052 or 3003 aluminum. A pair of end plates 71-1 and 73-1 are disposed at opposite ends of tube 69-1, end plates 71-1 and 73-1 each having a centrally disposed opening through which the ends of pipe 63-1 extend. Pipe 63-1, tube 69-1, and end plates 71-1 and 71-3 together define a chamber or compartment 75-1 which is fluid-tight and which contains lithium bromide (LiBr) as a thermal storage material. Chamber 75-1 preferably contains about 1-2 kg of lithium bromide and is able to accommodate about 2-4 pounds of hydrating solvent. The hydrating solvent is dispensed into chamber 75-1 through piping 76-1 which, in turn, is connected to pipe 37-1 of assembly 31. Steam is removed from chamber 75-1 through piping 77-1 which, in turn, is connected to pipe 39-1 of assembly 31.

A plurality of fins 78 are mounted, e.g., by welding, on the outside of tube 69-1 in a staggered arrangement in such a way that fins 78 and 69-1 are in an intimate heat exchange relationship.

Core 61-1 further includes a tubular housing 79-1 made of a corrosion-resistant material in which tube 69-1 and its contents are received. Preferably, insulation (not shown) is applied to the inside surface of housing 79-1. The opposite ends of housing 79-1 are covered by end plates 71-1 and 73-1; however, a plurality of openings 81 are formed in plates 71-1 and 73-1 so that ambient air may enter and leave the space between tube 69-1 and housing 79-1.

Heat exchanger 13 further includes a pair of shrouds 87-1 and 87-2, shroud 87-1 being mounted over the inlet side of end plates 71-1 and 71-2 and shroud 87-2 being mounted over the outlet side of end plates 73-1 and 73-2. Shrouds 87-1 and 87-2 are hollow structures, each shroud 87 having a pair of openings 88 positioned for fluid communication with openings 81 of end plates 71 or 73. In this manner, ambient air is permitted to flow in a path from the space inside shroud 87-1 to the space between tube 69-1 and housing 79-1 and then on to the space inside shroud 87-2. An inlet pipe 89-1 is mounted within an opening on the inlet end of shroud 87-1 to permit ambient air to enter thereinto from pipe 17, and an outlet pipe 89-2 is mounted within a similar opening on the outlet end of shroud 87-2 to permit ambient air to exit therefrom into pipe 19.

An inlet pipe assembly 91, which is used to convey hot engine exhaust gases from pipe 15 into pipes 63 of cores 61-1 and 61-2, is mounted inside shroud 87-1 and extends partially through the inlet end thereof. An outlet pipe assembly, which is used to convey the exhaust gases from pipes 63 of cores 61-1 and 61-2 to pipe 21, is mounted inside shroud 87-2 and extends partially through the outlet end thereof.

The operation of system 11 will now be described. For purposes of this description, it will be assumed that the thermal storage material, e.g., LiBr, is in solution inside of the respective chambers 75 of cores 61-1 and 61-3 and that the internal combustion engine of the vehicle has been running for a few minutes so that neither the catalytic converter nor the passenger cabin requires pre-heating. To start the dehydration reaction, valve 36 is closed (valve 41 already being open). Closure of valve 36 may be done manually by the operator or automatically by a timer after the engine has been running for a pre-determined period of time. As the hot exhaust gases emitted from the vehicle's engine travel through the pipes 63 of heat exchanger 13, some of their thermal energy is transferred to the LiBr solution. This transfer of thermal energy causes the hydrating solvent to be vaporized from the LiBr solution, the vapor escaping from heat exchanger 13 through pipes 76-1 and 76-2 to pipes 39-1 and 39-2 of assembly 31. The vapor is then conveyed through blow off tank 45 to condenser 47, where it is condensed back into a liquid, and then returned to water tank 33. This continues for a period of time until all of the hydrating solvent has been removed from the LiBr solution, leaving only the warm dehydrated salt. After a prescribed period during which the LiBr will have been dehydrated completely, valve 41 is closed by an engine operation timer or other suitable means so that no moisture can enter or leave chamber 75. The engine can now be turned off with chamber 75, and the dehydrated LiBr therein allowed to cool to ambient temperature. The thermal energy of the exhaust gases is now stored as a chemical potential in the LiBr. The system can remain substantially indefinitely at room temperature in this condition so long as moisture is excluded from chamber 75.

When it is desired to pre-heat the catalytic converter, and passenger cabin of the vehicle in cold temperatures prior to starting the engine, valves 36 and 41 are opened and blower 23 is turned on by an operator actuated control. As soon as valve 36 opens, water (or a water/ethanol mixture, depending upon the ambient temperature) flows by gravity from tank 33 into chamber 75 of heat exchanger 13 whereupon the dehydrated LiBr salt contained therein is immediately put into solution. Valve 41 is opened, as well as valve 36, to prevent vacuum backup in tank 33 due to the draining solvent. As soon as the LiBr is hydrated by the solvent, the potential energy in the storage material is converted into heat. This heat is transferred from chamber 75 to the ambient air blown by blower 23 into the space between tube 69 and housing 79. The heated air is then conveyed by pipe 19 to pipe 25, which conveys the heated air to the catalytic converter, and depending upon the setting of valve 24, additionally to pipe 27, which conveys the heated air to the passenger cabin. After a short period of time, i.e., less than 1 minute, the catalytic converter is preheated by at least 100 degrees Fahrenheit and the vehicle engine may be turned on. Blower 23 is preferably turned off after a few minutes whose duration may be set by a timer.

It is believed that with about 2 kg of LiBr and about 4 lbs. of solvent, ambient air can be heated for about 10 minutes using system 11. Similarly, with about 1 kg of LiBr and about 2 lbs. of solvent, ambient air can be heated for about 5 minutes using system 11.

As can readily be appreciated, instead of being connected to the catalytic converter and the passenger cabin of a vehicle, pipe 25 and/or pipe 27 of system 11 could be connected to one or more other auxiliary components of the vehicle.

Referring now to FIG. 12, there is schematically shown one embodiment of a system for pre-heating the battery of an automotive vehicle, the automotive vehicle having an internal combustion engine or other means for producing hot exhaust gases, the system being constructed according to the teachings of the present invention and represented generally by reference numeral 101.

System 101 includes a heat exchanger 103 which is similar in construction to heat exchanger 13 of system 11, the primary difference being that heat exchanger 103 is adapted to heat a fluid present in a coil 105 wrapped around each LiBr chamber. When the reaction takes place in the LiBr chamber, the liquid in the coils is heated. A pump 107 is used to circulate the warm liquid through the battery which, as a result, becomes heated. As can readily be appreciated, with system 101 it is necessary that the battery be constructed so that the heated fluid may be received thereby. It is also necessary that the fluid used in the system have a high boiling point in order to avoid a phase change during LiBr dehydration.

The embodiments of the present invention recited herein are intended to be merely exemplary and those skilled in the art will be able to make numerous variations and modifications to it without departing from the spirit of the present invention. For example, instead of using hot engine exhaust gases to dehydrate the hydrated thermal storage material, one could conceivable use any sufficiently hot fluid generated by the automotive vehicle or otherwise to dehydrate the hydrated thermal storage material. All such variations and modifications are intended to be within the scope of the present invention as defined in the claims appended hereto.

What is claimed is:

1. A system for pre-heating one or more auxiliary components of an automotive vehicle, the automotive vehicle having means for producing hot exhaust gases, the system comprising:
   a) a heat exchanger comprising
      i) a pair of thermally conductive chambers,
      ii) a quantity of thermal storage material of the type that undergoes a reversible dehydration/hydration process disposed in each of said thermally conductive chambers,
      iii) means for conducting hot exhaust gases into an intimate heat exchange relation with said thermally conductive chambers to dehydrate the thermal storage material contained therein, and
      iv) means for conducting an appropriate fluid into an intimate heat exchange relation with said thermally conductive chambers so as to become heated thereby;
   b) a hydrating solvent delivery, collection and storage assembly including a container containing a quantity of hydrating solvent, wherein said hydrating solvent is a mixture of ethanol and water, means for conducting the hydrating solvent into said thermally conductive chambers for hydrating the thermal storage material contained therein whereby thermal energy is evolved therefrom to heat said chambers and means for conducting dehydration vapor from said thermally conductive chambers for condensation and return to said container;
   c) means for conveying hot exhaust gases to said heat exchanger from an internal combustion engine; and
   d) means for conveying the heated fluid from said heat exchanger to one or more auxiliary components of the motor vehicle.

2. A system for pre-heating a desired element of an automotive vehicle, the automotive vehicle including an engine capable of producing hot exhaust gases, the system comprising:
   a) a heat exchanger comprising
      i) a thermally conductive chamber,
      ii) a quantity of thermal storage material of the type that undergoes a reversible dehydration/hydration process disposed in said thermally conductive chamber,
      iii) means for conducting hot engine exhaust gases into an intimate heat exchange relation with said thermally conductive chamber to dehydrate the thermal storage material contained therein, and
      iv) means for conducting an appropriate fluid into an intimate heat exchange relation with said thermally conductive chamber so as to become heated thereby;
   b) a hydrating solvent delivery, collection and storage assembly including a container containing a quantity of hydrating solvent, said hydrating solvent consisting essentially of a mixture of ethanol and water, means for conducting the hydrating solvent into said thermally conductive chamber for hydrating the thermal storage material contained therein whereby thermal energy is evolved therefrom to heat said chamber and means for conducting dehydration vapor from said thermally conductive chamber for condensation and return to said container;
   c) means for conveying hot engine exhaust gases to said heat exchanger from the engine;
   d) means for conveying the heated fluid from said heat exchanger to a desired element of a motor vehicle.

3. A system for pre-heating a catalytic converter of an automotive vehicle, the automotive vehicle having means for producing hot exhaust gases, the system comprising:
   a) a heat exchanger comprising
      i) a pair of thermally conductive chambers,
      ii) a quantity of thermal storage material of the type that undergoes a reversible dehydration/hydration process disposed in each of said thermally conductive chambers,
      iii) means for conducting hot exhaust gases into an intimate heat exchange relation with said thermally conductive chambers to dehydrate the thermal storage material contained therein, and
      iv) means for conducting an appropriate fluid into an intimate heat exchange relation with said thermally conductive chambers so as to become heated thereby;
   b) a hydrating solvent delivery, collection and storage assembly including a container containing a quantity of hydrating solvent, means for conducting the hydrating solvent into said thermally conductive chambers for hydrating the thermal storage material contained therein whereby thermal energy is evolved therefrom to heat said chambers and means for conducting dehydration vapor from said thermally conductive chambers for condensation and return to said container;
   c) means for conveying hot exhaust gases to said heat exchanger from an internal combustion engine; and
   d) means for conveying the heated fluid from said heat exchanger to the catalytic converter of the motor vehicle.

4. A system for pre-heating a catalytic converter and a passenger cabin of an automotive vehicle, the automotive vehicle having means for producing hot exhaust gases, the system comprising:
- a) a heat exchanger comprising
  - i) a pair of thermally conductive chambers,
  - ii) a quantity of thermal storage material of the type that undergoes a reversible dehydration/hydration process disposed in each of said thermally conductive chambers,
  - iii) means for conducting hot exhaust gases into an intimate heat exchange relation with said thermally conductive chambers to dehydrate the thermal storage material contained therein, and
  - iv) means for conducting an appropriate fluid into an intimate heat exchange relation with said thermally conductive chambers so as to become heated-thereby;
- b) a hydrating solvent delivery, collection and storage assembly including a container containing a quantity of hydrating solvent, means for conducting the hydrating solvent into said thermally conductive chambers for hydrating the thermal storage material contained therein whereby thermal energy is evolved therefrom to heat said chambers and means for conducting dehydration vapor from said thermally conductive chambers for condensation and return to said container;
- c) means for conveying hot exhaust gases to said heat exchanger from an internal combustion engine; and
- d) means for conveying the heated fluid from said heat exchanger to the catalytic converter and the passenger cabin of the motor vehicle.

5. The system as claimed in claim 4 wherein said means for conveying the heated fluid from said heat exchanger comprises a valve positionable in either a first setting wherein the heated fluid is conveyed only to the catalytic converter or a second setting wherein the heated fluid is conveyed to the catalytic converter and to the passenger cabin.

6. The system as claimed in claim 5 wherein said hydrating solvent delivery, collection and storage assembly also includes a condenser for condensing the dehydration vapor.

7. The system as claimed in claim 5 wherein the fluid to be heated is ambient air, the system further comprising a blower for blowing ambient air into said heat exchanger.

* * * * *